United States Patent
Lamers

(10) Patent No.: US 11,192,442 B2
(45) Date of Patent: Dec. 7, 2021

(54) TRANSMISSION ARRANGEMENT AND DRIVE DEVICE FOR A HYBRID VEHICLE

(71) Applicant: Schaeffler Technologies AG & Co. KG, Herzogenaurach (DE)

(72) Inventor: Johannes Lamers, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 286 days.

(21) Appl. No.: 16/334,803

(22) PCT Filed: Oct. 13, 2017

(86) PCT No.: PCT/DE2017/100871
§ 371 (c)(1),
(2) Date: Mar. 20, 2019

(87) PCT Pub. No.: WO2018/095460
PCT Pub. Date: May 31, 2018

(65) Prior Publication Data
US 2019/0275878 A1    Sep. 12, 2019

(30) Foreign Application Priority Data
Nov. 22, 2016   (DE) .......................... 102016222972.9

(51) Int. Cl.
*B60K 6/48* (2007.10)
*B60K 6/365* (2007.10)
(Continued)

(52) U.S. Cl.
CPC ................ *B60K 6/48* (2013.01); *B60K 6/365* (2013.01); *B60K 6/543* (2013.01);
(Continued)

(58) Field of Classification Search
CPC .......... B60K 6/48; B60K 6/365; B60K 6/543; B60K 2006/4808; Y02T 10/62;
(Continued)

(56) References Cited

U.S. PATENT DOCUMENTS

| 5,433,282 A | 7/1995 | Shuzo et al. |
| 6,269,895 B1 | 8/2001 | Tanuguchi et al. |

(Continued)

FOREIGN PATENT DOCUMENTS

| AT | 510393 A2 | 3/2012 |
| CN | 101495338 A | 7/2009 |

(Continued)

OTHER PUBLICATIONS

Fev EPGS: The Ultra-Compact Hybrid Drive, the Size is What Matters!

*Primary Examiner* — Russell Frejd
(74) *Attorney, Agent, or Firm* — Kevin Parks

(57) ABSTRACT

A transmission arrangement for a hybrid vehicle includes a powershift transmission, a summing gear assembly, a first transmission input shaft, and a second transmission input shaft. The summing gear assembly is for transmitting a drive torque to a drive shaft. The first transmission input shaft is connectable to an electric machine to transmit a first drive torque from the electric machine directly to the summing gear assembly. The second transmission input shaft is connectable to an internal combustion engine to transmit a second drive torque from the internal combustion engine to the summing gear assembly via the powershift transmission.

19 Claims, 2 Drawing Sheets

(51) Int. Cl.
*B60K 6/543* (2007.10)
*F16H 3/72* (2006.01)
*F16H 37/02* (2006.01)
*F16H 37/08* (2006.01)
*F16H 48/08* (2006.01)

(52) U.S. Cl.
CPC ...... B60K 2006/4808 (2013.01); *F16H 3/725* (2013.01); *F16H 37/022* (2013.01); *F16H 37/0826* (2013.01); *F16H 48/08* (2013.01); *Y02T 10/62* (2013.01)

(58) Field of Classification Search
CPC .... F16H 3/725; F16H 37/022; F16H 37/0826; F16H 48/08
See application file for complete search history.

(56) References Cited

U.S. PATENT DOCUMENTS

| | | | | |
|---|---|---|---|---|
| 2002/0177500 | A1* | 11/2002 | Bowen | B60K 6/48 475/5 |
| 2006/0025265 | A1 | 2/2006 | Sowul et al. | |
| 2015/0158485 | A1 | 6/2015 | Kawasaki et al. | |
| 2015/0197145 | A1 | 7/2015 | Kochidomar et al. | |
| 2015/0276022 | A1 | 10/2015 | Lichtenegger et al. | |
| 2015/0298535 | A1 | 10/2015 | Luehrs et al. | |
| 2015/0345603 | A1* | 12/2015 | Kaltenbach | F16H 3/097 74/661 |
| 2016/0052382 | A1 | 2/2016 | Clark et al. | |
| 2018/0202519 | A1* | 7/2018 | Beck | B60K 6/48 |
| 2018/0319266 | A1* | 11/2018 | Kaltenbach | F16H 3/097 |

FOREIGN PATENT DOCUMENTS

| | | |
|---|---|---|
| CN | 102126425 A | 7/2011 |
| CN | 102343796 A | 2/2012 |
| CN | 102815198 A | 12/2012 |
| CN | 105697693 A | 6/2016 |
| DE | 19955311 A1 | 5/2001 |
| EP | 0925981 A2 | 12/1998 |
| EP | 1657100 A1 | 5/2006 |
| JP | 2009113673 A | 5/2009 |
| WO | 2012034154 A1 | 3/2012 |
| WO | 2013008566 A1 | 1/2013 |
| WO | 2015059252 A1 | 4/2015 |

* cited by examiner

TRANSMISSION ARRANGEMENT AND DRIVE DEVICE FOR A HYBRID VEHICLE

CROSS-REFERENCE TO RELATED APPLICATIONS

This application is the United States National Phase of PCT Appln. No. PCT/DE2017/100871 filed Oct. 13, 2017, which claims priority to German Application No. DE102016222972.9 filed Nov. 22, 2016, the entire disclosures of which are incorporated by reference herein.

TECHNICAL FIELD

The disclosure relates to a transmission arrangement for a hybrid vehicle. The hybrid vehicle includes an internal combustion engine and an electric machine, which are used to drive the hybrid vehicle. During this process, drive torques are transmitted from the electric machine and the internal combustion engine to at least one drive shaft, wherein the wheels of the hybrid vehicle can be driven via the at least one drive shaft.

BACKGROUND

A transmission arrangement of this kind is known from "FEV ePGS—Der ultrakompakte Hybridantrieb" ["FEV ePGS—The ultracompact hybrid drive"]. In this transmission arrangement, the drive torques of the internal combustion engine and of the electric machine are combined in a summing gear assembly. The summing gear assembly, which is embodied as a planetary gear assembly, is arranged ahead of the powershift transmission (e.g., an automatic transmission, a CVT, or a double clutch transmission). Thus, the drive torque of the electric machine is also transmitted to the summing gear assembly via the powershift transmission. Therefore, there is no direct ratio for the electric machine, and hence the electric machine must always contribute to the (frictional) losses of the powershift transmission.

SUMMARY

The disclosure relates to a transmission arrangement for a hybrid vehicle having an internal combustion engine and an electric machine, wherein, via the transmission arrangement, a first drive torque of the electric machine and a second drive torque of the internal combustion engine can be transmitted to at least one drive shaft of the hybrid vehicle. The transmission arrangement comprises at least one powershift transmission and one summing gear assembly, as well as a first transmission input shaft and a second transmission input shaft. Starting from the first transmission input shaft driven by the electric machine, the first drive torque can be transmitted directly to the summing gear assembly and, starting from the second transmission input shaft driven by the internal combustion engine, the second drive torque can be transmitted to the summing gear assembly via the powershift transmission. The drive torques can be transmitted to the at least one drive shaft via the summing gear assembly.

The proposal here is therefore that only the second drive torque should be transmitted to the summing gear assembly via the powershift transmission. Thus, the first drive torque is not transmitted to the summing gear assembly via the powershift transmission but is transmitted to it (directly) while bypassing the powershift transmission.

Any selectable transmission can be used as a powershift transmission, that is to say, for example, an automatic transmission, a double clutch transmission or a CVT (continuously variable transmission).

In an example embodiment, the transmission input shafts can be connected to the electric machine or to the internal combustion engine via reduction gear assemblies (e.g. gearwheel pairs).

In an example embodiment, the electric machine has a stator and a rotor, and the rotor is connected to the first transmission input shaft in a manner which prevents relative rotation. Here, "in a manner which prevents relative rotation" means, for example, that a rotation of one component always brings about a rotation of the other component connected thereto in a manner which prevents relative rotation.

In an example embodiment, the internal combustion engine is connected to the second transmission input shaft in a manner which prevents relative rotation, that is to say without the possibility of selectable connection via a clutch, for example. A torsional vibration damper may be arranged between the internal combustion engine or a crankshaft of the internal combustion engine and the second drive shaft.

The summing gear assembly can be a planetary gear assembly having at least one sun gear, one planet carrier and one annulus. The first transmission input shaft is connected to the summing gear assembly via the annulus, and the second transmission input shaft is connected to the summing gear assembly via the sun gear. This means, for example, that the first drive torque introduced into the transmission arrangement via the first transmission input shaft is transmitted onward into the summing gear assembly via the annulus. The second drive torque introduced into the transmission arrangement via the second transmission input shaft is transmitted onward into the summing gear assembly via the powershift transmission and then via the sun gear.

According to another embodiment, the summing gear assembly is a planetary gear assembly having at least one sun gear, one planet carrier and one annulus. The first transmission input shaft is connected to the summing gear assembly via the sun gear, and the second transmission input shaft is connected to said summing gear assembly via the annulus. This means, for example, that the first drive torque introduced into the transmission arrangement via the first transmission input shaft is transmitted onward into the summing gear assembly via the sun gear. The second drive torque introduced into the transmission arrangement via the second transmission input shaft is transmitted onward into the summing gear assembly via the powershift transmission and then via the annulus.

In principle, it is also possible for one of the transmission input shafts to be connected to the summing gear assembly via the planet carrier. In this case, the other transmission input shaft in each case is then connected to the summing gear assembly via the sun gear or the annulus.

In an example embodiment, the summing gear assembly is a planetary gear assembly having at least one sun gear, one planet carrier and one annulus, and the planet carrier forms a housing of a differential. A first drive shaft and a second drive shaft can be driven via the differential.

In an example embodiment, the axes of rotation of the drive shaft and of the housing of the differential are arranged coaxially with one another. For example, the summing gear assembly is in this way arranged coaxially with the differential, thereby achieving a particularly space-saving embodiment of the transmission arrangement.

According to another embodiment, the transmission arrangement has a first clutch for the selectable connection of the first transmission input shaft to the second transmission input shaft. By means of the first clutch, it is thus possible to connect the first transmission input shaft and the second transmission input shaft to one another in a manner which prevents relative rotation. In this case, the first clutch is, for example, not arranged directly between the first transmission input shaft and the second transmission input shaft but between two components, of which one is connected to the first transmission input shaft in a manner which prevents relative rotation and the other is connected to the other transmission input shaft in a manner which prevents relative rotation.

In an example embodiment, the summing gear assembly is a planetary gear assembly having at least one sun gear, one planet carrier and one annulus, and the first clutch connects the sun gear and the annulus selectably to one another (in a manner which prevents relative rotation). In this case, it is also possible for the first clutch in each case to connect two different ones of the components comprising the sun gear, the planet carrier and the annulus to one another in a manner which prevents relative rotation.

In an example embodiment, the first clutch is a commonly known friction clutch, e.g. a multiplate clutch. The first clutch can be actuated hydraulically or electrically but is expressly not limited to actuation in this way.

In an example embodiment, the transmission arrangement comprises a second clutch, via which the first transmission input shaft can be connected to a transmission housing of the transmission arrangement in a manner which prevents relative rotation. In an example embodiment, the transmission arrangement comprises a third clutch, via which the second transmission input shaft can be connected to a transmission housing of the transmission arrangement in a manner which prevents relative rotation. In this case, the second clutch and the third clutch are, for example, not arranged directly between the respective transmission input shaft and the transmission housing but between two components, of which one is connected to the respective transmission input shaft in a manner which prevents relative rotation and the other is connected to the transmission housing in a manner which prevents relative rotation.

The second clutch and the third clutch can be embodied in the same way as the first clutch. It is also possible for the second clutch and the third clutch to be embodied as "dog clutches", which form a connection which prevents relative rotation not by a frictional connection but by a positive connection.

If the second clutch and the third clutch are actuated (i.e. closed), neither the first transmission input shaft nor the second transmission input shaft can be moved. It is thereby possible to achieve the function of a parking brake/immobilizing brake, thus eliminating the need for a separate parking brake in the hybrid vehicle.

In an example embodiment, the summing gear assembly is a planetary gear assembly having at least one sun gear, one planet carrier and one annulus. At least the second clutch or the third clutch is arranged on the planetary gear assembly and connects one of the components comprising the sun gear, the planet carrier and the annulus to the transmission housing in a manner which prevents relative rotation.

In an example embodiment, the first transmission input shaft is connected to the summing gear assembly via a fixed first transmission ratio. In an example embodiment, the powershift transmission is connected to the summing gear assembly via a fixed second transmission ratio.

There is furthermore a proposal for a drive device for a hybrid vehicle, at least comprising an electric machine, an internal combustion engine and a transmission arrangement as described above, wherein the internal combustion engine is connected permanently to the powershift transmission in a manner which prevents relative rotation. Thus, the internal combustion engine is connected to the second transmission input shaft in a manner which prevents relative rotation, without the possibility of selectable connection via a clutch, for example. A torsional vibration damper may be arranged between the internal combustion engine or a crankshaft of the internal combustion engine and the second drive shaft.

The transmission arrangement described here results in the following operating possibilities for the transmission arrangement and for the drive device:

(1) Driving electrically: transmission of the first drive torque exclusively to the at least one drive shaft; in this case, the third clutch is actuated, with the result that the second transmission input shaft is connected to the transmission housing in a manner which prevents relative rotation. Accordingly, the speed of the second transmission input shaft is zero.

(2) Driving with the internal combustion engine: transmission of the second drive torque exclusively to the at least one drive shaft; in this case, the second clutch is closed (actuated), with the result that the first transmission input shaft is connected to the transmission housing in a manner which prevents relative rotation. Accordingly, the speed of the first transmission input shaft is zero.

(3) Starting with the internal combustion engine: the second transmission input shaft is driven by the internal combustion engine; in this case, the second clutch and the third clutch are open (unactuated); the first transmission input shaft is driven in a different direction of rotation (i.e. backwards) by the electric machine, with the result that the electric machine acts as a generator; the speed of the first transmission input shaft is adjusted by the electric machine in such a way that the at least one drive shaft is stationary (speed=zero); the speed of the first transmission input shaft is then reduced by the electric machine in the direction of a zero speed, with the result that the at least one drive shaft is accelerated.

(4) Hybrid driving: the second clutch and the third clutch are open (unactuated);
   a. Boosting: a first drive torque of the electric machine and a second drive torque of the internal combustion engine are in the same direction and are combined by means of the summing gear assembly.
   b. Energy recovery: a first drive torque of the electric machine and a second drive torque of the internal combustion engine are opposed and the electric machine is driven by the internal combustion engine.
   c. Setting an operating point: at a chosen speed of the hybrid vehicle (speed of the at least one drive shaft), an operating point can be set by means of the (chosen, variable) transmission ratio of the powershift transmission and by means of the power ratio of the electric machine and the internal combustion engine.

(5) Starting the internal combustion engine: the first clutch is closed in a controlled manner and the possibly closed third clutch is opened; the second transmission input shaft (and hence the crankshaft of the internal combustion engine) is (are) accelerated by means of a first drive torque provided by the electric machine and by means of the further closure of the first clutch; the electric machine compensates the torque of the first clutch during this starting of the internal combustion engine.

(6) Starting in reverse: transmission of the first drive torque exclusively to the at least one drive shaft; in this case, the third clutch is actuated, with the result that the second transmission input shaft is connected to the transmission housing in a manner which prevents relative rotation. Accordingly, the speed of the second transmission input shaft is zero.

The statements relating to the drive device apply equally to the transmission arrangement and vice versa.

BRIEF DESCRIPTION OF THE DRAWINGS

The disclosure and the technical environment are explained in greater detail below by means of the figures. It should be noted that there is no intention to restrict the disclosure by the illustrative embodiments shown. For example, unless explicitly stated otherwise, it is also possible to isolate partial aspects of the situations explained in the figures and to combine them with other components and insights from the present description and/or figures. It should be noted that the figures and especially the size relationships illustrated are only schematic. Identical reference signs denote identical objects, and therefore supplementary explanations from different figures can be drawn upon if appropriate. In the drawings.

DETAILED DESCRIPTION

Figure 1:
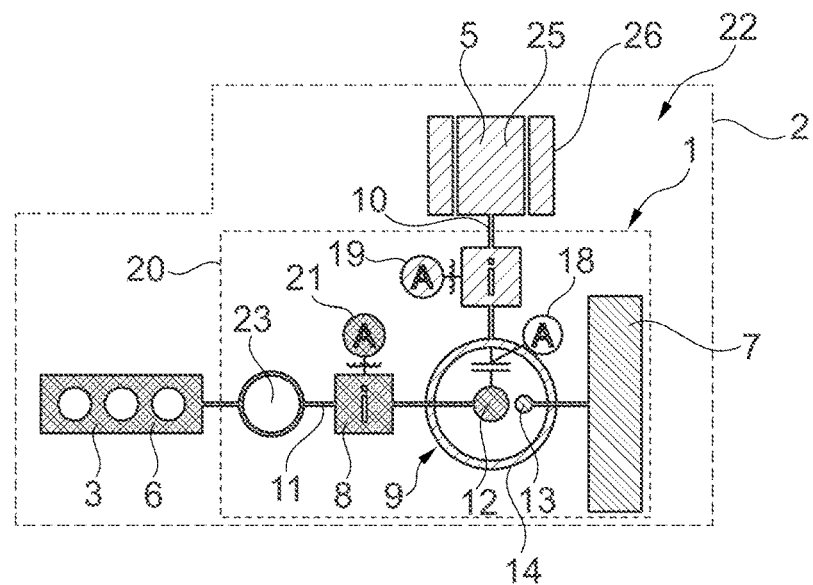
FIG. 1 shows a schematic view of a hybrid vehicle having a drive device.

FIG. 1 shows a schematic view of a hybrid vehicle 2 having a drive device 22. The drive assembly comprises an electric machine 4, an internal combustion engine 3 and a transmission arrangement 1. A first drive torque 5 of the electric machine 4 and a second drive torque 6 of the internal combustion engine 3 can be transmitted to a drive shaft 7 of the hybrid vehicle 2 via the transmission arrangement 1. The transmission arrangement 1 comprises a powershift transmission 8 and a summing gear assembly 9 as well as a first transmission input shaft 10 and a second transmission input shaft 11. Starting from the first transmission input shaft 10 driven by the electric machine 4, the first drive torque 5 can be transmitted directly to the summing gear assembly 9. Starting from the second transmission input shaft 11 driven by the internal combustion engine 3, the second drive torque 6 can be transmitted to the summing gear assembly 9 via the powershift transmission 8. The drive torques 5, 6 can be transmitted to the drive shaft 7 via the summing gear assembly 9.

The internal combustion engine 3 is connected permanently to the powershift transmission 8 in a manner which prevents relative rotation. Thus, the internal combustion engine 3 is connected to the second transmission input shaft 11 in a manner which prevents relative rotation, without the possibility of selectable connection via a clutch, for example. A torsional vibration damper 23 is arranged between the internal combustion engine 3 or a crankshaft of the internal combustion engine 3 and the second drive shaft 11.

The summing gear assembly 9 is a planetary gear assembly having a sun gear 12, a planet carrier 13 and an annulus, or ring gear, 14.

The transmission arrangement 1 has a first clutch 18 for the selectable connection of the first transmission input shaft 10 to the second transmission input shaft 11. By means of the first clutch 18, it is possible to connect the first transmission input shaft 10 and the second transmission input shaft 11 to one another in a manner which prevents relative rotation. The selectable first clutch 18 connects the sun gear 12 and the annulus 14 to one another.

The transmission arrangement 1 furthermore comprises a second clutch 19, via which the first transmission input shaft 10 can be connected to a transmission housing 20 of the transmission arrangement 1 in a manner which prevents relative rotation. The transmission arrangement 1 comprises a third clutch 21, via which the second transmission input shaft 11 can be connected to a transmission housing 20 of the transmission arrangement 1 in a manner which prevents relative rotation. The second clutch 19 and the third clutch 21 are not arranged directly between the respective transmission input shaft 10, 11 and the transmission housing 20 but between two components, of which one is connected to the respective transmission input shaft 10, 11 in a manner which prevents relative rotation and the other is connected to the transmission housing 20 in a manner which prevents relative rotation.

Figure 2:
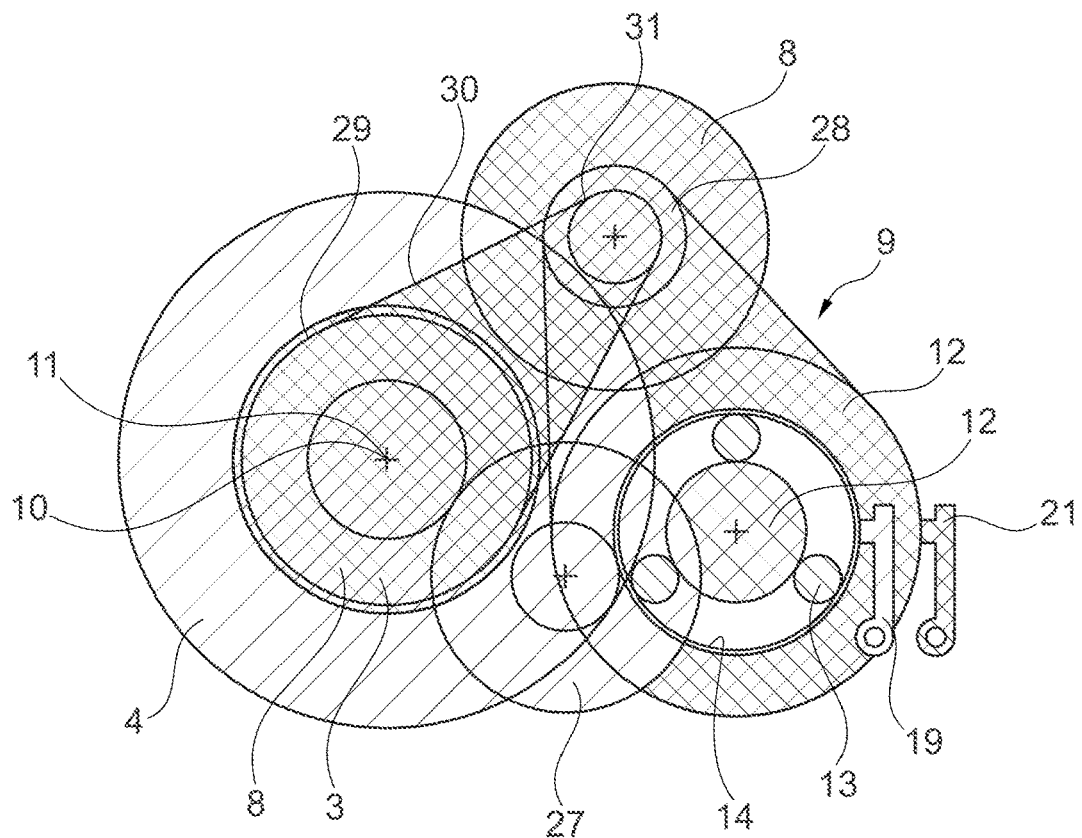
FIG. 2 shows a schematic side view of a transmission arrangement.

FIG. 2 shows a schematic side view of a transmission arrangement 1. The transmission arrangement 1 comprises a powershift transmission 8 and a summing gear assembly 9 as well as a first transmission input shaft 10 and a second transmission input shaft 11. The transmission input shafts 10, 11 are arranged coaxially with one another. Starting from the first transmission input shaft 10 driven by the electric machine 4, the first drive torque 5 can be transmitted directly to the summing gear assembly 9. Starting from the second transmission input shaft 11 driven by the internal combustion engine 3, the second drive torque 6 can be transmitted to the summing gear assembly 9 via the powershift transmission 8. The drive torques 5, 6 can be transmitted to the drive shaft 7 via the summing gear assembly 9. Here, the powershift transmission used is a CVT (continuously variable transmission), in which a first cone pulley pair 29 is connected via a chain 30 or a belt to a second cone pulley pair 31.

The summing gear assembly 9 is a planetary gear assembly having a sun gear 12, a planet carrier 13 and an annulus 14. The first transmission input shaft 10 is connected to the annulus 14 of the summing gear assembly 9 via the first transmission ratio 27, and the second transmission input shaft 11 is connected to the summing gear assembly 9 via the sun gear 12. This means that the first drive torque 5 introduced into the transmission arrangement 1 via the first transmission input shaft 10 is transmitted onward into the summing gear assembly 9 via the annulus 14. The second drive torque 6 introduced into the transmission arrangement 1 via the second transmission input shaft 11 is transmitted onward into the summing gear assembly 9 via the powershift transmission 8 and then via the sun gear 12.

The first transmission input shaft 10 is connected to the summing gear assembly 9 via a fixed first transmission ratio 27. The powershift transmission 8 is connected to the summing gear assembly 9 via a fixed second transmission ratio 28.

The transmission arrangement 1 comprises a second clutch 19, via which the first transmission input shaft 10 can be connected to a transmission housing 20 of the transmission arrangement 1 in a manner which prevents relative rotation. The transmission arrangement 1 comprises a third clutch 21, via which the second transmission input shaft 11 can be connected to a transmission housing 20 of the transmission arrangement 1 in a manner which prevents relative rotation. The second clutch 19 is arranged between the transmission housing 20 and the annulus 14. The third clutch 21 is arranged between the transmission housing 20 and the sun gear 12.

Figure 3:
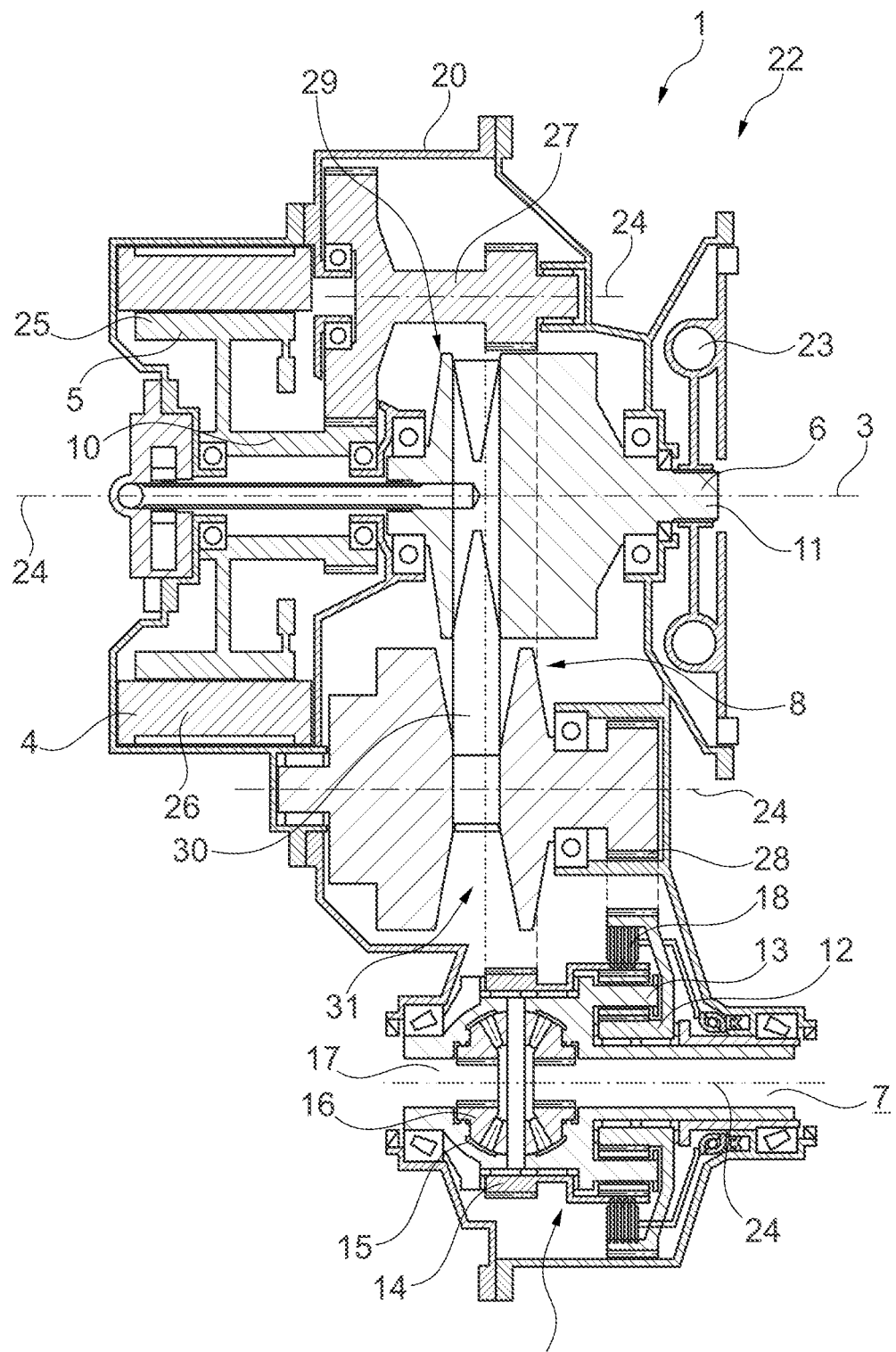
FIG. 3 shows a schematic longitudinal view of the transmission arrangement shown in FIG. 2.

FIG. 3 shows a schematic longitudinal view of the transmission arrangement 1 shown in FIG. 2. This is a projected view. For example, the gearwheels of the first transmission ratio 27 and of the annulus 14 are directly in engagement with one another, the dashed line being intended to illustrate this. Attention is drawn to the statements relating to FIG. 2. The electric machine 4 has a stator 26 and a rotor 25, wherein the rotor 25 is connected to the first transmission input shaft 10 in a manner which prevents relative rotation. The powershift transmission used is a CVT (continuously variable transmission), in which a first cone pulley pair 29 is connected via a chain 30 or a belt to a second cone pulley pair 31.

The internal combustion engine 3 is connected permanently to the powershift transmission 8 in a manner which prevents relative rotation. Thus, the internal combustion engine 3 is connected to the second transmission input shaft 11 in a manner which prevents relative rotation, without the possibility of selectable connection via a clutch, for example. A torsional vibration damper 23 is arranged between the internal combustion engine 3 or a crankshaft of the internal combustion engine 3 and the second drive shaft 11.

The summing gear assembly 9 is a planetary gear assembly having a sun gear 12, a planet carrier 13 and an annulus 14. The first transmission input shaft 10 is connected to the annulus 14 of the summing gear assembly 9 via the first transmission ratio 27, and the second transmission input shaft 11 is connected to the summing gear assembly 9 via the powershift transmission 8, the second transmission ratio 28 and the sun gear 12. This means that the first drive torque 5 introduced into the transmission arrangement 1 via the first transmission input shaft 10 is transmitted onward into the summing gear assembly 9 via the annulus 14. The second drive torque 6 introduced into the transmission arrangement 1 via the second transmission input shaft 11 is transmitted onward into the summing gear assembly 9 via the powershift transmission 8 and then via the sun gear 12.

Here, the second transmission ratio 28 is implemented by means of a gearwheel pairing between the powershift transmission 8 and the summing gear assembly 9 (to be more precise the sun gear 12). Here, the gearwheels are connected to one another by means of a chain, for example, the dashed line being intended to illustrate this.

The planet carrier 13 forms a housing 15 of a differential 16, wherein a first drive shaft 7 and a second drive shaft 17 can be driven by means of the differential 16. The wheels of a common axle of the hybrid vehicle are driven via the first drive shaft 7 and the second drive shaft 17. The axes of rotation 24 of the drive shafts 7, 17 and of the housing 15 of the differential 16 are arranged coaxially with one another.

The first clutch 18 connects the sun gear 12 and the annulus 14 selectably to one another (in a manner which prevents relative rotation). The first clutch is embodied as a commonly known friction clutch, in this case as a multiplate clutch. The first clutch 18 is actuated hydraulically.

REFERENCE LABELS 1 transmission arrangement
2 hybrid vehicle
3 internal combustion engine
4 electric machine
5 first drive torque
6 second drive torque
7 first drive shaft
8 powershift transmission
9 summing gear assembly
10 first transmission input shaft
11 second transmission input shaft
12 sun gear
13 planet carrier
14 annulus
15 housing
16 differential
17 second drive shaft
18 first clutch
19 second clutch
20 transmission housing
21 third clutch
22 drive device
23 torsional vibration damper
24 axis of rotation
25 rotor
26 stator
27 first transmission ratio
28 second transmission ratio
29 first cone pulley pair
30 chain
31 second cone pulley pair

The invention claimed is:

1. A transmission arrangement for a hybrid vehicle comprising:
   a powershift transmission;
   a summing gear assembly for transmitting a drive torque to a drive shaft;
   a first transmission input shaft connectable to an electric machine to transmit a first drive torque from the electric machine directly to the summing gear assembly; and,
   a second transmission input shaft connectable to an internal combustion engine to transmit a second drive torque from the internal combustion engine to the summing gear assembly via the powershift transmission, wherein:
     the first transmission input shaft comprises a first axis; and,
     the second transmission input shaft comprises a second axis, aligned with the first axis.

2. The transmission arrangement of claim 1 further comprising a first clutch for selectably connecting the first transmission input shaft to the second transmission input shaft.

3. The transmission arrangement of claim 2, wherein:
   the summing gear assembly is a planetary gear assembly comprising a sun gear, a planet carrier and an annulus; and,
   the first clutch selectably connects the sun gear to the annulus.

4. The transmission arrangement of claim 1, further comprising:
   a transmission housing; and,
   a second clutch for selectably connecting the first transmission input shaft to the transmission housing to prevent relative rotation.

5. The transmission arrangement of claim 4, wherein:
   the summing gear assembly is a planetary gear assembly comprising a sun gear, a planet carrier, and an annulus; and, the second clutch is arranged on the summing gear assembly and connects the sun gear, the planet carrier or the annulus to the transmission housing to prevent relative rotation.

6. The transmission arrangement of claim 1, further comprising:
a transmission housing; and,
a third clutch for selectably connecting the second transmission input shaft to the transmission housing to prevent relative rotation.

7. The transmission arrangement of claim 6, wherein:
the summing gear assembly is a planetary gear assembly comprising a sun gear, a planet carrier, and an annulus; and,
the third clutch is arranged on the summing gear assembly and connects the sun gear, the planet carrier or the annulus to the transmission housing to prevent relative rotation.

8. The transmission arrangement of claim 1, further comprising:
a differential comprising a housing;
a first drive shaft; and,
a second drive shaft, wherein:
the summing gear assembly is a planetary gear assembly comprising a sun gear, a planet carrier, and an annulus;
the planet carrier forms the housing; and,
the first drive shaft and the second drive shaft can be driven via the differential.

9. The transmission arrangement of claim 8 wherein the first drive shaft comprises a third axis, parallel to and offset from the first axis and the second axis.

10. The transmission arrangement of claim 1 wherein the powershift transmission is a CVT transmission comprising:
a first cone pulley pair;
a second cone pulley pair; and,
a chain or belt connecting the first cone pulley pair to the second cone pulley pair.

11. The transmission arrangement of claim 1, wherein the summing gear assembly is a planetary gear assembly comprising:
a sun gear connected to the second transmission input shaft;
a planet carrier; and,
an annulus connected to the first transmission input shaft.

12. The transmission arrangement of claim 1, wherein the summing gear assembly is a planetary gear assembly comprising:
a sun gear connected to the first transmission input shaft;
a planet carrier; and,
an annulus connected to the second transmission input shaft.

13. A drive device for a hybrid vehicle comprising:
the transmission arrangement of claim 1;
the electric machine; and,
the internal combustion engine connected to the powershift transmission in a manner that prevents relative rotation.

14. The drive device of claim 13 further comprising a torsional vibration damper connecting the internal combustion engine to the powershift transmission.

15. A transmission arrangement for a hybrid vehicle comprising:
a housing;
a planetary gear comprising a sun gear, a planet carrier, and a ring gear;
an electric machine comprising a stator fixed to the housing, and a rotor connected to the ring gear;
a powershift transmission comprising an input for connection to an internal combustion engine and an output connected to the sun gear;
a differential including a differential housing fixed to the planet carrier; and,
a first clutch for selectively connecting the sun gear to the ring gear.

16. The transmission arrangement of claim 15 wherein the powershift transmission is a continuously variable transmission comprising:
a first cone pulley pair fixed to the input;
a second cone pulley pair fixed to the output; and,
a chain or a belt connecting the first cone pulley pair to the second cone pulley pair.

17. The transmission arrangement of claim 15 further comprising:
a first chain or a first belt connecting the rotor to the ring gear; and,
a second chain or a second belt connecting the output to the sun gear.

18. The transmission arrangement of claim 15 wherein:
the rotor comprises a first axis; and,
the input comprises a second axis, aligned with the first axis.

19. A transmission arrangement for a hybrid vehicle comprising:
a powershift transmission;
a summing gear assembly for transmitting a drive torque to a drive shaft;
a first transmission input shaft connectable to an electric machine to transmit a first drive torque from the electric machine directly to the summing gear assembly; and,
a second transmission input shaft connectable to an internal combustion engine to transmit a second drive torque from the internal combustion engine to the summing gear assembly via the powershift transmission, wherein the summing gear assembly is a planetary gear assembly comprising:
a sun gear connected to a one of the first transmission input shaft or the second transmission input shaft;
a planet carrier; and,
an annulus connected to the other one of the first transmission input shaft or the second transmission input shaft.

* * * * *